United States Patent
Hallapuro et al.

(10) Patent No.: US 9,300,978 B2
(45) Date of Patent: Mar. 29, 2016

(54) COMBINED MOTION VECTOR AND REFERENCE INDEX PREDICTION FOR VIDEO CODING

(75) Inventors: Antti Olli Hallapuro, Tampere (FI); Kemai Ugur, Tampere (FI); Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1729 days.

(21) Appl. No.: 12/407,588

(22) Filed: Mar. 19, 2009

(65) Prior Publication Data

US 2009/0304084 A1    Dec. 10, 2009

Related U.S. Application Data

(60) Provisional application No. 61/038,008, filed on Mar. 19, 2008, provisional application No. 61/043,366, filed on Apr. 8, 2008.

(51) Int. Cl.
  *H04N 19/573* (2014.01)
  *H04N 19/52* (2014.01)
  *H04N 19/593* (2014.01)

(52) U.S. Cl.
  CPC .............. *H04N 19/573* (2014.11); *H04N 19/52* (2014.11); *H04N 19/593* (2014.11)

(58) Field of Classification Search
  None
  See application file for complete search history.

(56) References Cited

U.S. PATENT DOCUMENTS

| | | | |
|---|---|---|---|
| 2004/0001546 A1* | 1/2004 | Tourapis et al. | 375/240.12 |
| 2005/0117646 A1* | 6/2005 | Joch et al. | 375/240.16 |
| 2006/0176957 A1* | 8/2006 | Han et al. | 375/240.16 |
| 2006/0280253 A1* | 12/2006 | Tourapis et al. | 375/240.16 |
| 2006/0294171 A1* | 12/2006 | Bossen et al. | 708/300 |
| 2007/0147502 A1* | 6/2007 | Nakamura | 375/240.12 |
| 2008/0170618 A1* | 7/2008 | Choi et al. | 375/240.16 |

FOREIGN PATENT DOCUMENTS

GB    2329295 A    3/1999

OTHER PUBLICATIONS

Jung J et al: "Competition-based scheme for motion vector selection and coding" ITU-T Study Group 16—Video Coding Experts Group (VCEG), No. VCEG-AC06, Jul. 17, 2006, pp. 1-7, XP002439849 Klagenfurt, Austria.*

Wiegand et al. "Overview of the H.264 / AVC Video Coding Standard," IEEE Transactions on Circuits and Systems for Video Technology, Jul. 2003.*

(Continued)

*Primary Examiner* — William C Vaughn, Jr.
*Assistant Examiner* — Michael J Hess
(74) *Attorney, Agent, or Firm* — Alston & Bird LLP

(57) ABSTRACT

A system and method for improving the coding efficiency of motion vector information in video coding. According to various embodiments, a list of motion vector predictor candidates is arranged according to predefined rules. Each motion vector also has a reference index associated with it. One of the motion vector candidates is then selected as a predictor based on predefined rules, or the selection is explicitly signaled in the bitstream. The reference index associated with the selected motion vector is used as a reference index for the current block. The reference index is predicted along with the motion vector. Such embodiments can improve the compression efficiency of modern video codecs.

38 Claims, 10 Drawing Sheets

(56) References Cited

OTHER PUBLICATIONS

International Search Report and Written Opinion, received in correspnding PCT Application No. PCT/IB2009/000550, issued by European Patent Office (ISA), Oct. 27, 2009, 12 pages.

Jung, Joel, et al., "Competition-Based Scheme for Motion Vector Selection and Coding" Video Coding Experts Group, Jul. 17, 2006, 7 pages.

Lainema, Jani, et al., "Improved Motion Vector Prediction for TML-4", ITU Telecommunications Standardization Sector, Aug. 16, 2000, 2 pages.

Laroche, Guillaume, et al., "Competition Based Prediction for Skip Mode Motion Vector Using Macroblock Classification for the H.264 JM KTA Software", Advanced Concepts for Intelligent Vision Systems, vol. 4678, Aug. 28, 2007, pp. 789-799.

Tourapis, Alexis M., et al., "Motion Vector Prediction with Reference Frame Consideration", Proceedings of SPIE, vol. 5203, 2003, pp. 440-447.

Kim, Sung Deuk, et al., "An Efficient Motion Vector Coding Scheme Based on Minimum Bitrate Prediction", IEEE Transactions on Image Processing, vol. 8, No. 8, Aug. 1999, pp. 1117-1120.

Jung, Joel, et al., "Competition-Based Scheme for Motion Vector Selection and Coding", ITU-Telecommunications Standardization Sector, 29 Meeting: Klagenfurt, Austria, Jul. 17-18, 2006, 7 pages.

\* cited by examiner

COMBINED MOTION VECTOR AND REFERENCE INDEX PREDICTION FOR VIDEO CODING

RELATED APPLICATIONS

This application claims the benefit of U.S. Application No. 61/038,008 filed Mar. 19, 2008 and U.S. Application No. 61/043,366 filed Apr. 8, 2008, which is incorporated herein by reference.

FIELD OF THE INVENTION

The present invention relates generally to the coding and decoding of media content. More particularly, the present invention relates to the coding and decoding of digital video content.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A digital video signal comprises a sequence of still images (also referred to as "pictures" or "frames") in an uncompressed digital format. Each video frame is formed from an array of pixels. For example, in a digital image format known as the Quarter Common Interchange Format (QCIF), an image or frame comprises 25,344 pixels arranged in an array 176×144 pixels. The goal of the video encoding (coding or compression) is to reduce the data to represent a video signal. In general, there is a significant degree of correlation between neighboring pixel values within an image of a sequence of images. Referred as spatial redundancy, in practical terms, this means that the value of any pixel within an image is substantially the same as the value of other pixels in its immediate vicinity. Additionally, consecutive images of an image sequence also tend to be quite similar. Thus, the overall change between one image and the next is rather small. This means that there is considerable temporal redundancy within a typical digital image sequence. A video encoder transforms an input video into a compressed representation suitable for storage and/or transmission, and a video decoder uncompresses the compressed content representation back into a viewable form.

State of the art existing video coding systems reduce the amount of data used to represent the video signal by exploiting spatial and temporal redundancies within the sequence of images. Such "hybrid" video coding methods, for example used in ITU-T H.263 and H.264, encode the video information in two phases. First, pixel values in a certain picture area or "block" are predicted using, for example, motion compensation mechanisms or spatial mechanisms. Motion compensation mechanisms may include, for example, finding and indicating an area in a previously coded video frame that corresponds closely to the block being coded. Spatial mechanisms may include, for example, using the pixel values around the block to be coded in a specified manner. Second, the prediction error, i.e. the difference between the predicted block of pixels and the original block of pixels, is coded. This is typically accomplished by transforming the difference in pixel values using a specified transform such as a Discreet Cosine Transform (DCT) or a variant thereof, quantizing the coefficients and entropy coding the quantized coefficients. By varying the fidelity of the quantization process, the encoder can control the balance between the accuracy of the pixel representation (i.e., the picture quality) and the size of the resulting coded video representation (e.g., the file size or transmission bitrate).

The decoder reconstructs the output video by applying prediction mechanisms similar to those used by the encoder in order to form a predicted representation of the pixel blocks (using the motion or spatial information created by the encoder and stored in the compressed representation) and performing prediction error decoding. Prediction error decoding is the inverse operation of prediction error coding and is used to recover the quantized prediction error signal in a spatial pixel domain. After applying prediction and prediction error decoding mechanisms, the decoder sums up the prediction and prediction error signals (i.e., the pixel values) to form the output video frame. The decoder and encoder can also apply additional filtering mechanisms to improve the quality of the output video before passing it for display and/or storing it as prediction reference for the forthcoming frames in the video sequence.

In some video codecs, the motion information is indicated with motion vectors associated with each motion compensated image block. Each motion vector represents the displacement of the image block in the picture to be coded (at the encoder side) or decoded (at the decoder side) and the prediction source block in one of the previously coded or decoded pictures. In order to efficiently represent motion vectors, these are often coded differentially with respect to block specific predicted motion vectors. In many video codecs, the predicted motion vectors are created in a predefined way, for example by calculating the median of the encoded or decoded motion vectors of the adjacent blocks.

A number of video encoders utilize Lagrangian cost functions to determine optimal coding modes, e.g. the desired macroblock mode and associated motion vectors. This type of cost function uses a weighting factor λ to tie together the exact or estimated image distortion due to lossy coding methods and the exact or estimated amount of information that is required to represent the pixel values in an image area C=D+ λR, where C is the Lagrangian cost to be minimized, D is the image distortion (e.g., the mean squared error) with the mode and motion vectors considered, and R the number of bits needed to represent the required data to reconstruct the image block in the decoder (including the amount of data used to represent the candidate motion vectors).

SUMMARY OF THE INVENTION

Various embodiments provide a system and method for improving the coding efficiency of motion vector information. In various embodiments for decoding, for each block of a macroblock, a motion vector is generated that sums the motion vector prediction and delta motion vector that is signaled in the bistream. In order to determine the motion vector prediction, for a given motion block, a decoder first selects a number of candidate motion vector predictors based on parameters such as reference indices and coding modes of the current block and neighboring blocks. From the number of candidate motion vectors, a set of most probable candidates are selected using a predefined motion vector predictor selection process. The final predictor may be selected based on the information signalled in the bitstream that indicates which motion vector prediction among the set of most probable candidates is used. If the above process results in only one most probable motion vector prediction, then no information is signalled in the bitstream.

Various embodiments provide a method, computer program product and device for encoding an image. According to these embodiments, a plurality of motion vector predictors for a motion vector of a current image block are ordered, wherein a rank order of each motion vector predictor of the plurality of motion vector predictors is determined based at least in part on at least one of a coding mode of a block from which the respective motion vector predictor is derived and a reference index of the block from which the respective motion vector predictor is derived. A particular motion vector predictor of the current image block is selected from the plurality of motion vector predictors. An indication representative of the rank order of the selected motion vector predictor is provided in an encoded bitstream.

Various embodiments also provide a method, computer program product and device for decoding an image. According to these embodiments, a plurality of motion vector predictors of a current image block are ordered, wherein a rank order of each motion vector predictor of the plurality of motion vector predictors is determined based at least in part on at least one of a coding mode of a block from which the respective motion vector predictor is derived and a reference index of the block from which the respective motion vector predictor is derived. A particular motion vector predictor of the current image block is selected from the plurality of motion vector predictors for use in decoding. Information signaled within a bitstream is at least selectively used to select the particular motion vector.

Embodiments of the present invention also improve the coding efficiency of a video codec by making the selection of a motion vector predictor more accurate. According to various embodiments, a list of motion vector predictor candidates is arranged according to predefined rules. Typically, candidate vectors are from neighboring blocks. Each motion vector has also reference index associated with it. One of the motion vector candidates is then selected as a predictor based on predefined rules, or the selection is explicitly signaled in the bitstream. The reference index associated with the selected motion vector is used as a reference index for the current block. The reference index is predicted along with the motion vector. Such embodiments can improve the compression efficiency of modern video codecs.

Various embodiments comprise a method, computer program product and apparatus for encoding an image. A plurality of motion vector predictors are ordered for a motion vector of a current image block according to at least one predefined rule, wherein each motion vector predictor is associated with a reference index. A motion vector predictor is then selected from the plurality of motion vector predictors, and the reference index associated with the selected motion vector predictor is used as a reference index for the current image block. An indication representative of a rank order of the selected motion vector predictor may be at least selectively provided in an encoded bitstream.

Various embodiments also comprise a method, computer program product and apparatus for decoding an image. A plurality of predictors are ordered for a motion vector of a current image block according to at least one predefined rule, wherein each motion vector predictor is associated with a reference index. A motion vector predictor is then selected from the plurality of motion vector predictors of the current image block for use in decoding. The reference index associated with the selected motion vector predictor as a reference index of the current image block. Information signaled within a bitstream may be at least selectively used to select the particular motion vector.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
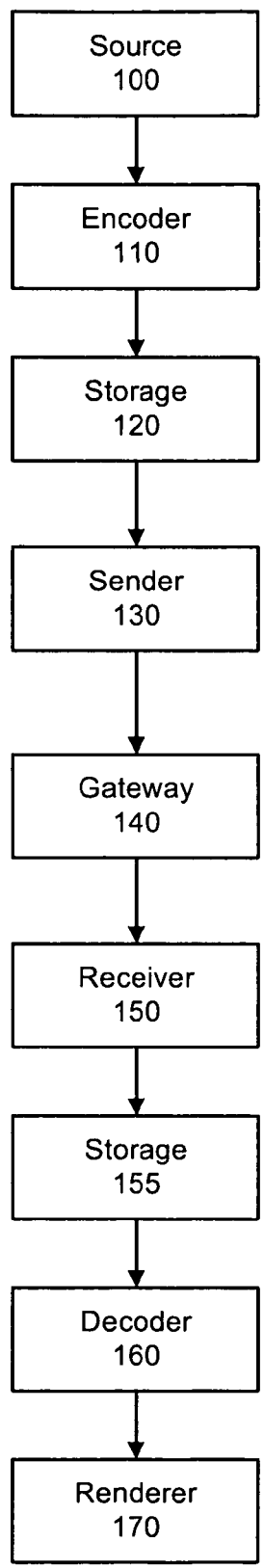
FIG. 1 is a graphical representation of a generic multimedia communication system within which various embodiments may be implemented.

FIG. 1 is a graphical representation of a generic multimedia communication system within which various embodiments may be implemented. As shown in FIG. 1, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 1 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are multiple coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

A sender 130 according to various embodiments may be configured to select the transmitted layers for multiple reasons, such as to respond to requests of the receiver 150 or prevailing conditions of the network over which the bitstream is conveyed. A request from the receiver can be, e.g., a request for a change of layers for display or a change of a rendering device having different capabilities compared to the previous one.

Figure 2:
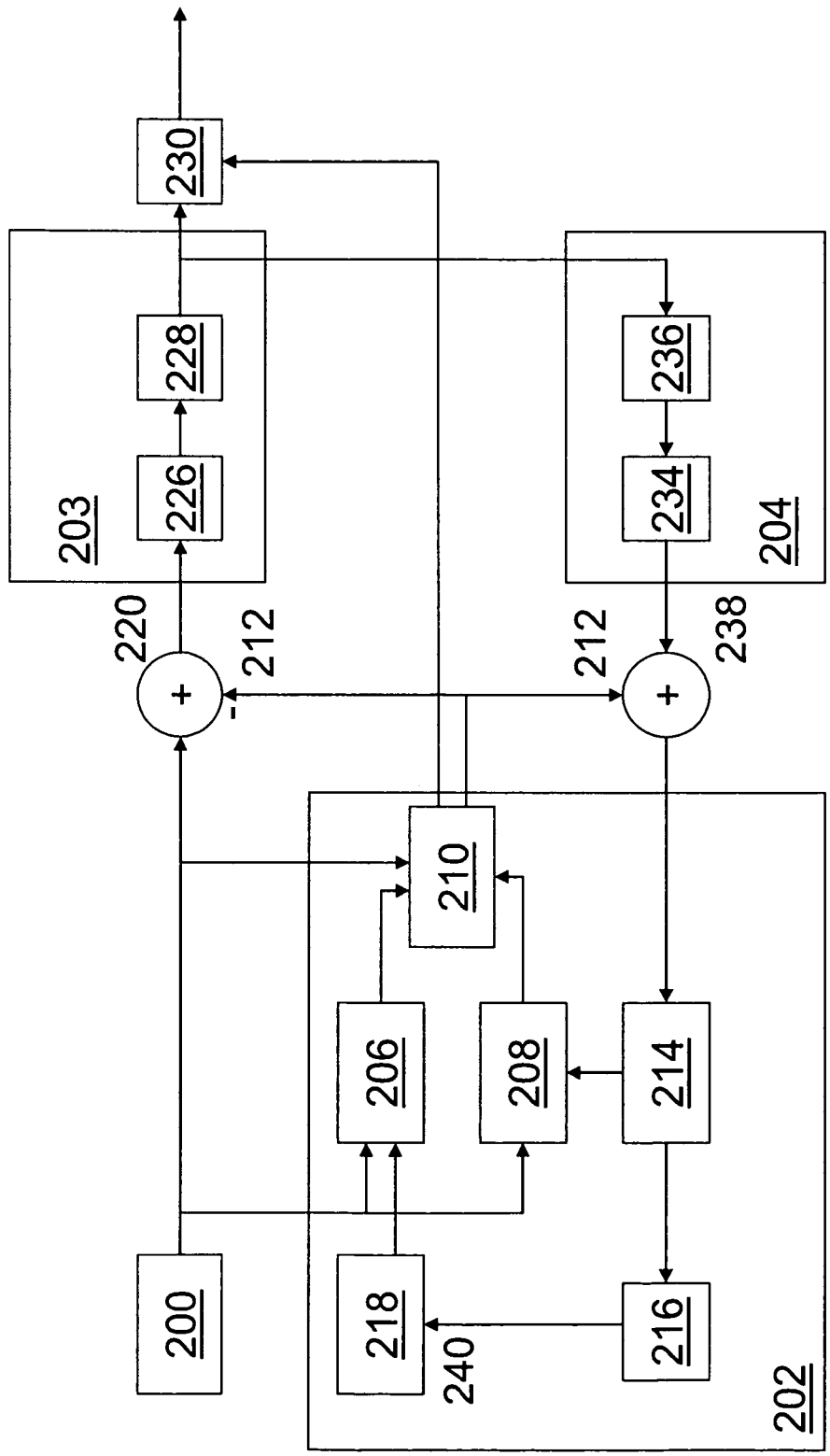
FIG. 2 is a block diagram of a representative video encoder.

FIG. 2 is a block diagram of a representative video encoder. More particularly, FIG. 2 shows how an image to be encoded 200 undergoes pixel prediction 202, prediction error coding 203 and prediction error decoding 204. For pixel prediction 202, the image 200 undergoes either inter-prediction 206 or intra-prediction 208 which, after mode selection 210, results in prediction representation of an image block 212. A preliminary reconstructed image 214 is also used for intra-prediction 208. Once all of the image blocks are processed, the preliminary reconstructed image 214 undergoes filtering at 216 to create a final reconstructed image 240, which is sent to a reference frame memory 218 and is also used for inter-prediction 206 of future frames.

The prediction representation of the image block 212, as well as the image to be encoded 200, are used together to define a prediction error signal 220 which is used for prediction error coding 203. In prediction error coding 203, the prediction error signal 220 undergoes transform 226 and quantization 228. The data describing prediction error and predicted representation of the image block 212 (e.g., motion vectors, mode information and quantized DCT+spatial samples) are passed to entropy coding 230. The prediction error decoding 204 is substantially the opposite of the prediction error coding 203, with the prediction error decoding including an inverse transform 234 and an inverse quantization 236. The result of the prediction error decoding 204 is a reconstructed prediction error signal 238, which is used in combination with the predicted representation of the image block 212 to create the preliminary reconstructed image 214.

Figure 3:
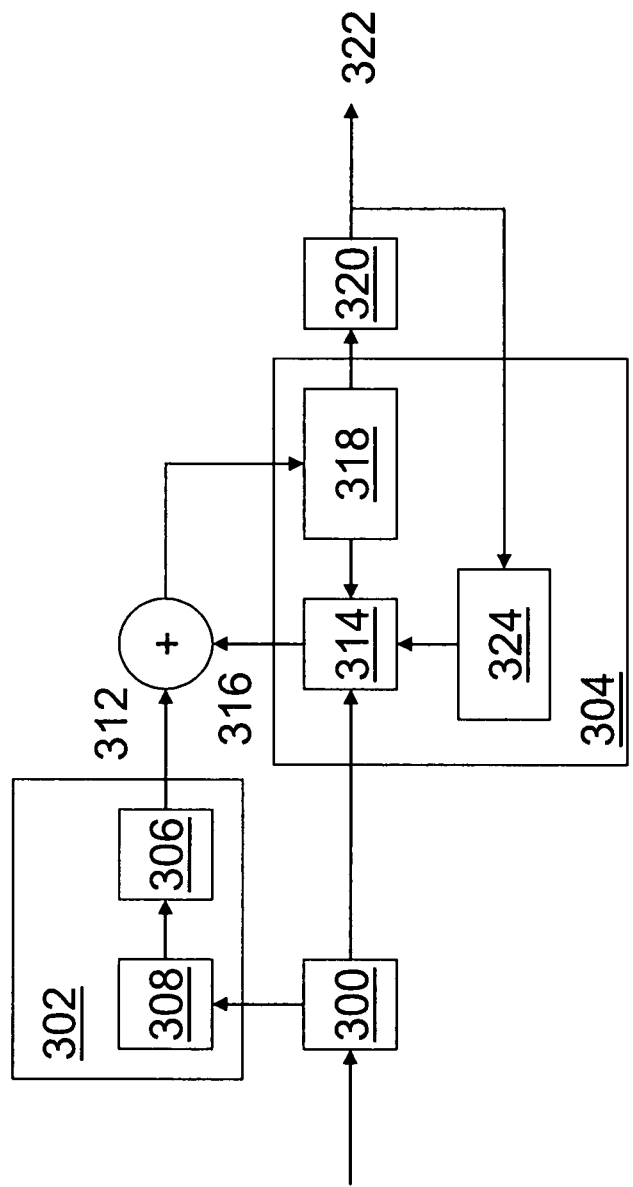
FIG. 3 is a block diagram of a representative video decoder.

FIG. 3 is a block diagram of a representative video decoder. As shown in FIG. 3, entropy decoding 300 is followed by both prediction error decoding 302 and pixel prediction 304. In prediction error decoding 302, an inverse transform 306 and inverse quantization 308 is performed, resulting in a reconstructed prediction error signal 312. For pixel prediction 304, either intra-prediction or inter-prediction occurs at 314 to create a predicted representation of an image block 316. The predicted representation of the image block 316 is used in conjunction with the reconstructed prediction error signal 312 to create a preliminary reconstructed image 318, which in turn can be used both for prediction 314. Once all of the image blocks have been processed, the preliminary reconstructed image 318 is passed for filtering 320. The filtered image can also be stored in reference frame memory 324, making it usable for prediction 314 as well.

Figure 4:
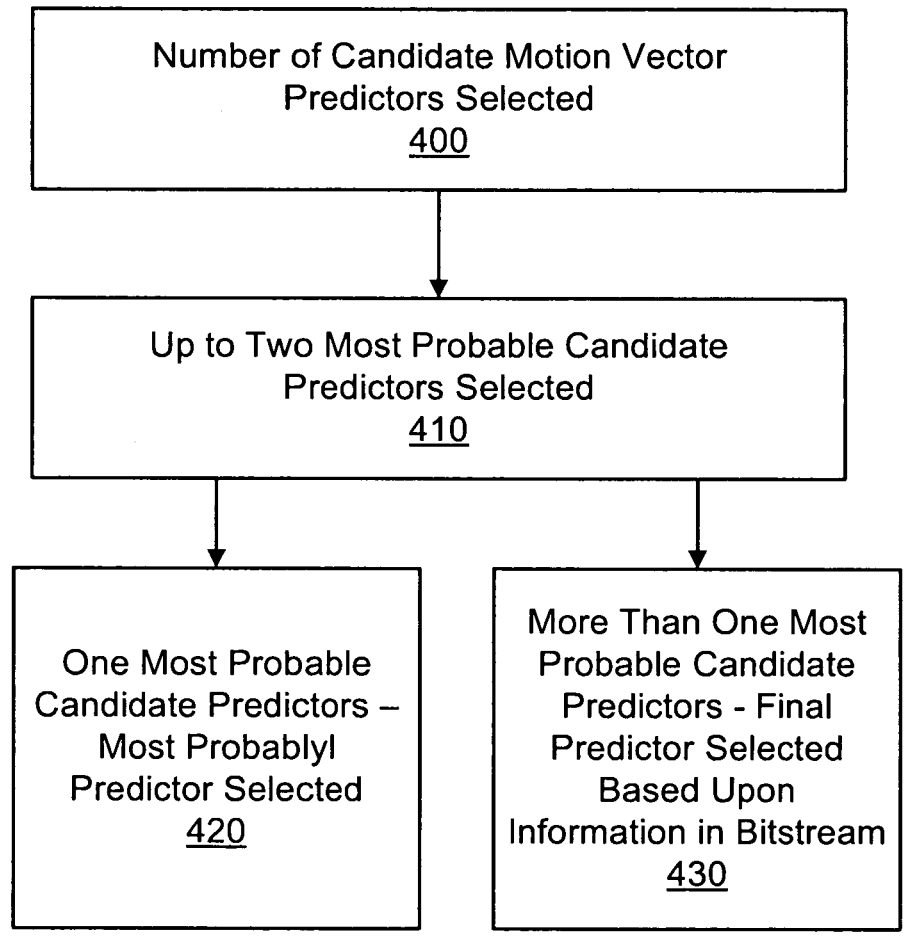
FIG. 4 is a flow chart showing generally how a motion vector predictor may be selected according to various embodiments.

Various embodiments provide a system and method for improving the coding efficiency of motion vector information. Using the decoder depicted in FIG. 3, in various embodiments a macroblock of size 16×16 is divided into up to four blocks. For each block, a motion vector is generated that sums the motion vector prediction and delta motion vector that is signaled in the bistream. A process used by the decoder to determine the motion vector prediction according to various embodiments is depicted generally in FIG. 4. In order to determine the motion vector prediction, for a given motion block, a decoder first selects a number of candidate motion vector predictors at 400 based on parameters such as reference indices and coding modes of the current block and neighboring blocks. From the number of candidate motion vectors, a set of most probable candidate motion vector predictors (e.g., two candidate motion vector predictors in a particular embodiment) are selected at 410 using a predefined motion vector predictor selection process. The final predictor may be selected at 430 based on the information signalled in the bit stream that indicates which motion vector prediction among the set of most probable candidates is used, if the set comprises more than one most probably candidate. If the above process results in only one most probable motion vector prediction, then no information is signalled in the bitstream and the most probable prediction is used at 420.

Various embodiments may also be used to improve the performance of macroblocks coded in SKIP mode. In SKIP mode, one or more macroblocks are coded together without transmitting any residual information, and these macroblocks share the same motion vector. Various embodiments serve to improve the coding of the SKIP mode by updating the motion vector of each macroblock. This is accomplished by performing the above processes and signalling in the bitstream for each macroblock. The selected motion vector predictor is used as the actual motion vector for the macroblock coded in SKIP mode.

Figure 5B:
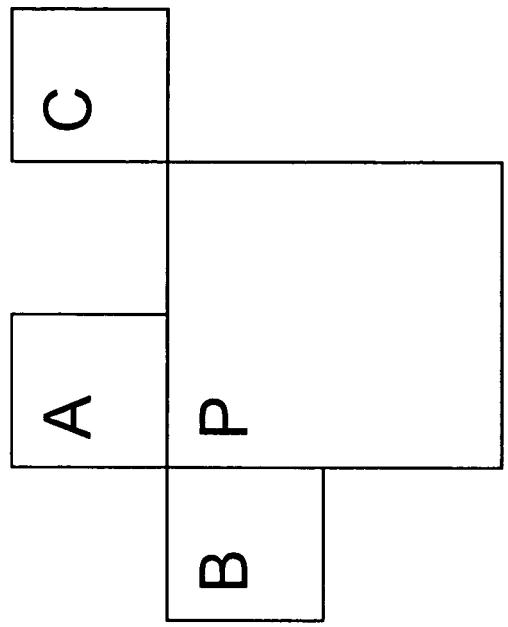
FIG. 5(b) shows a second potential arrangement of individual blocks A, B and C around a current block P.
Figure 5A:
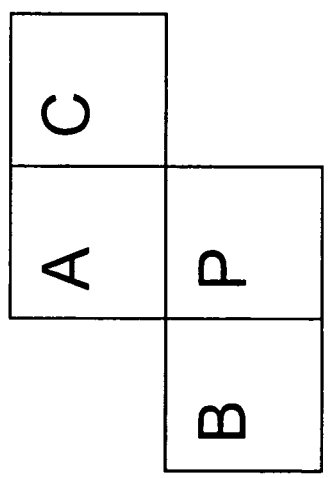
FIG. 5(a) shows a first potential arrangement of individual blocks A, B and C around a current block P.

For the implementation of various embodiments, it is helpful to consider a situation where a motion vector vecP is being decoded for a current block P, which also has a reference index refp (the reference index associated with a block indicates which previously-decoded picture is used for predicting the block.) Candidate vectors vecA, vecB and vecC and reference indices refA, refb and refC belong to respective neighboring blocks A, B and C, respectively. Two possible sets of locations of blocks A, B and C relative to block P are depicted in FIGS. 5(a) and 5(b).

Figure 6:
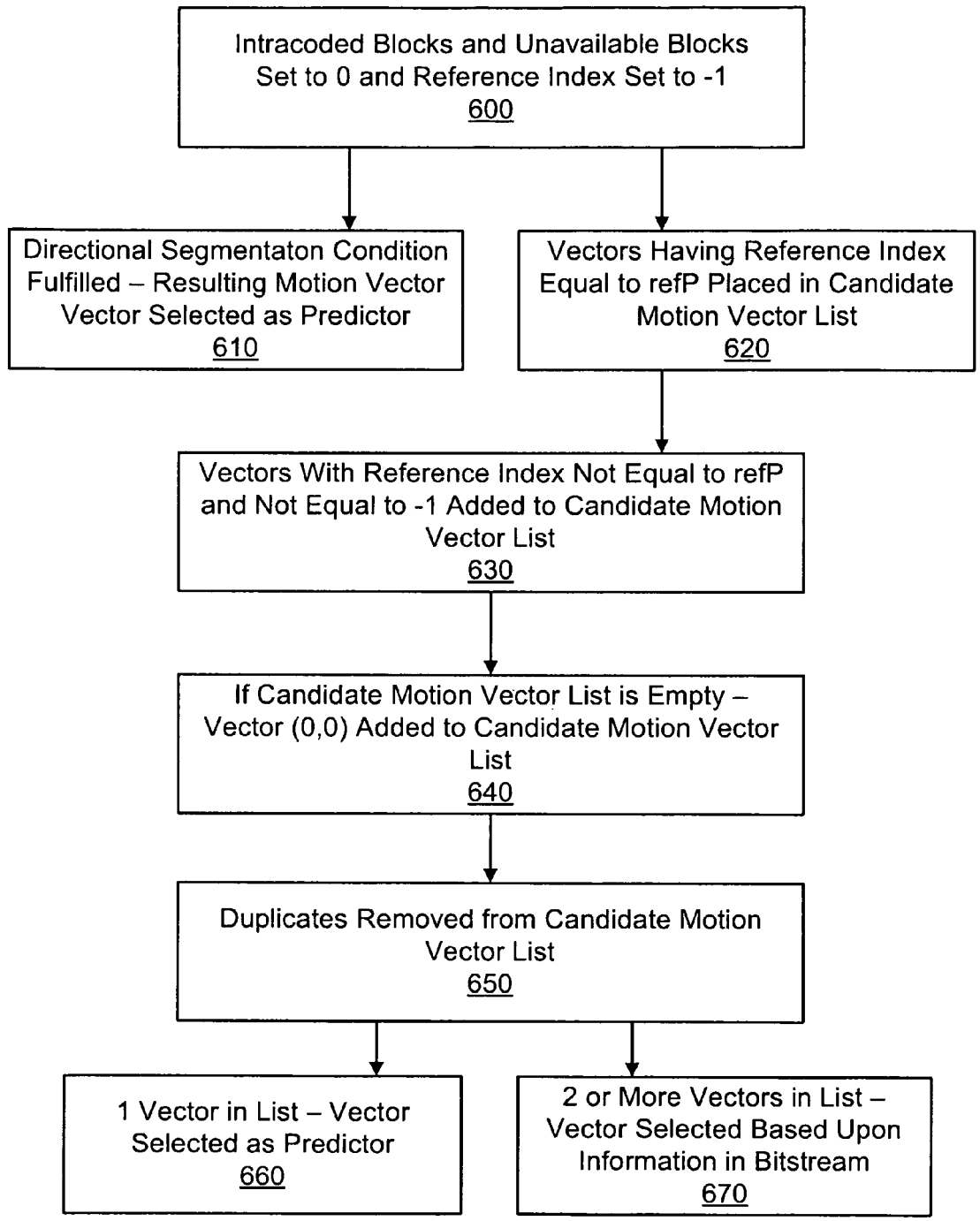
FIG. 6 is a flow chart showing a detailed process by which a predictor may be selected according to various embodiments.

In the above situation, the selection of the predictor for block P proceeds as follows, and as depicted in FIG. 6. If a block (A, B or C) is intra coded or is not available (which can occur, for example, if the block is at the picture boundary), then the respective vector is set to 0 and the reference index is set to −1. This process is represented at 600 in FIG. 6. It should be noted that −1 is arbitrarily selected, and the reference index could instead be any symbol that differentiates intra coded blocks and unavailable blocks from other blocks. In one embodiment, a directional segmentation prediction condition is checked in the same manner that a motion vector prediction is determined as discussed previously. If the direction segmentation condition is fulfilled, then the resulting motion vector is selected as a predictor. This process is depicted at 610 in FIG. 6.

At 620 in FIG. 6, vectors having a reference index equal to refP are placed in the candidate motion vector list in the order of vecA, vecB, vecC. At 630, vectors having reference index not equal to refp and not equal to −1 are added to the same candidate motion vector list based on the values of the reference indices. In one particular embodiment, a lower reference index has precedence over a higher reference index. If the candidate motion vector list is empty, vector (0,0) may be added to the list at 640. At 650, duplicates are removed from the candidate motion vector list.

In one particular embodiment, if the number of vectors in the list is 1, then the vector in the list is selected as a predictor at 660. If the number of vectors in the list is 2 or more, on the other hand, then at 670 either the first or second vector is selected based on the information that is stored in the compressed bit stream. In a particular embodiment, one bit is used for signalling the selection of the predictor, with a bit value of 0 indicating the selection of the first candidate and a bit value of 1 indicating the selection of the second candidate.

In one particular embodiment, the number of initial predictors is not restricted. However, it is possible to set a limit to the number of initial predictors In such a case where more than 2 predictors are used, the signalling is adapted to the larger number of predictors that can be signalled. The signalling can be based, for example, on fixed length codes, variable length Huffman codes, arithmetic codes or other codes.

With regard to the implementation depicted in FIG. 6, this implementation may be modified in a variety of ways. For example, the order of motion vectors that are put into the list might be different than vecA, vecB, vecC. This order may also depend on, for example, the motion partition or the mode of the macroblock or neighboring macroblocks. The order may also be signalled in the bitstream at different levels, such as in a slice header or a picture header. Additionally, instead of adding vector (0,0) to the list if the list is empty, another predefined or signalled vector could be used. Still further, motion vectors from different pictures can be used. For example, motion vectors from spatially co-located blocks from previously decoded pictures can be used. Furthermore, more candidate motion vectors might be generated from vecA, vecB, etc. This can be achieved, for example, by averaging two vectors.

Figure 7:
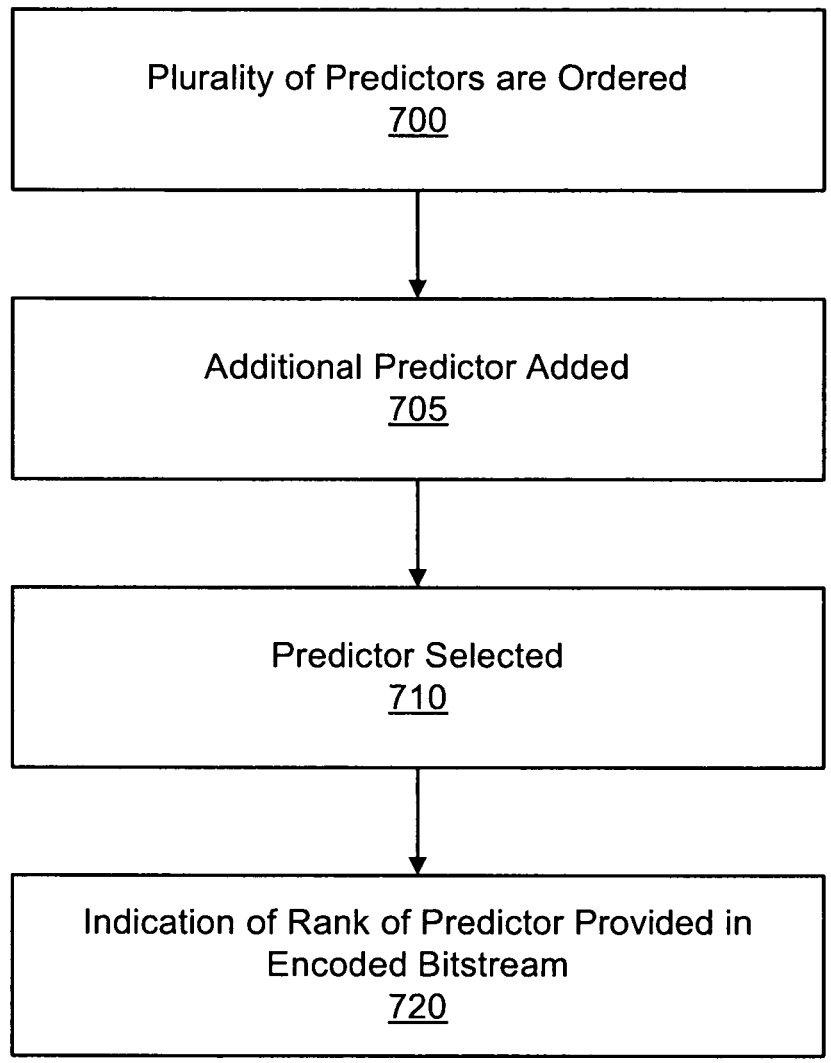
FIG. 7 is a flow chart showing an exemplary process for encoding an image according to various embodiments.

FIG. 7 is a flow chart showing an exemplary process for encoding an image according to various embodiments. At 700 in FIG. 7, a plurality of predictors for a motion vector of a current image block are ordered. The rank order of each predictor may be determined based at least in part on a coding mode of a block that the predictor is derived from. In certain embodiments, the predictors each have distinct values. Additionally, the coding mode may indicate the partitioning information of the block, and this partitioning information may represent the size and shape of the block. In certain embodiments, a block having the same reference index as the current image block may have a smaller rank order than a block with a reference index different from the reference index of the current image block.

At 705, an additional predictor may be added to the predictors that were ordered at 700, if the value of the additional predictor was not represented in the original set. At 710, a predictor for the motion vector of the current image block is selected from the plurality of predictors. At 720, an indication representative of the rank of the predictor may be provided in an encoded bitstream. The rank order of the predictor may be based at least in part on a reference index of the block from which the predictor is derived. As mentioned previously, this indication may not be provided in the encoded bitstream in certain situations, such as where it is determined that there is only one most probable predictor.

With regard to the plurality of predictors that are ordered at 700, these predictors may comprise at least one of the motion vectors for the following blocks: a neighboring block of the current image block, a block in a second image, a co-located block in a second image, a neighboring block of a co-located block in a second image, a block in a second layer (in the case where multiple layers of an image are being encoded and decoded), and a block in a second view (when multiple views of an image are being encoded and decoded).

Embodiments of the present invention also improve the coding efficiency of a video codec by making the selection of a motion vector predictor more accurate. According to various embodiments, a list of motion vector predictor candidates is arranged according to predefined rules. Typically, candidate vectors are from neighboring blocks. Each motion vector has also reference index associated with it. One of the motion vector candidates is then selected as a predictor based on predefined rules, or the selection is explicitly signaled in the bitstream. The reference index associated with the selected motion vector is used as a reference index for the current block. The reference index is predicted along with the motion vector. A process for encoding motion vector information according to these embodiments is similar to the process depicted in FIG. 7. In these embodiments, however, each motion vector predictor includes a reference index associated therewith.

For a better understanding of various embodiments, it is helpful to envision a situation where motion vector vecP is being decoded for a current block P. Candidate vectors vecA, vecB and vecC and associated reference indices refA, refb and refC belong to respective neighbouring blocks A, B and C, as shown in FIGS. 5(*a*) and 5(*b*).

Figure 8:
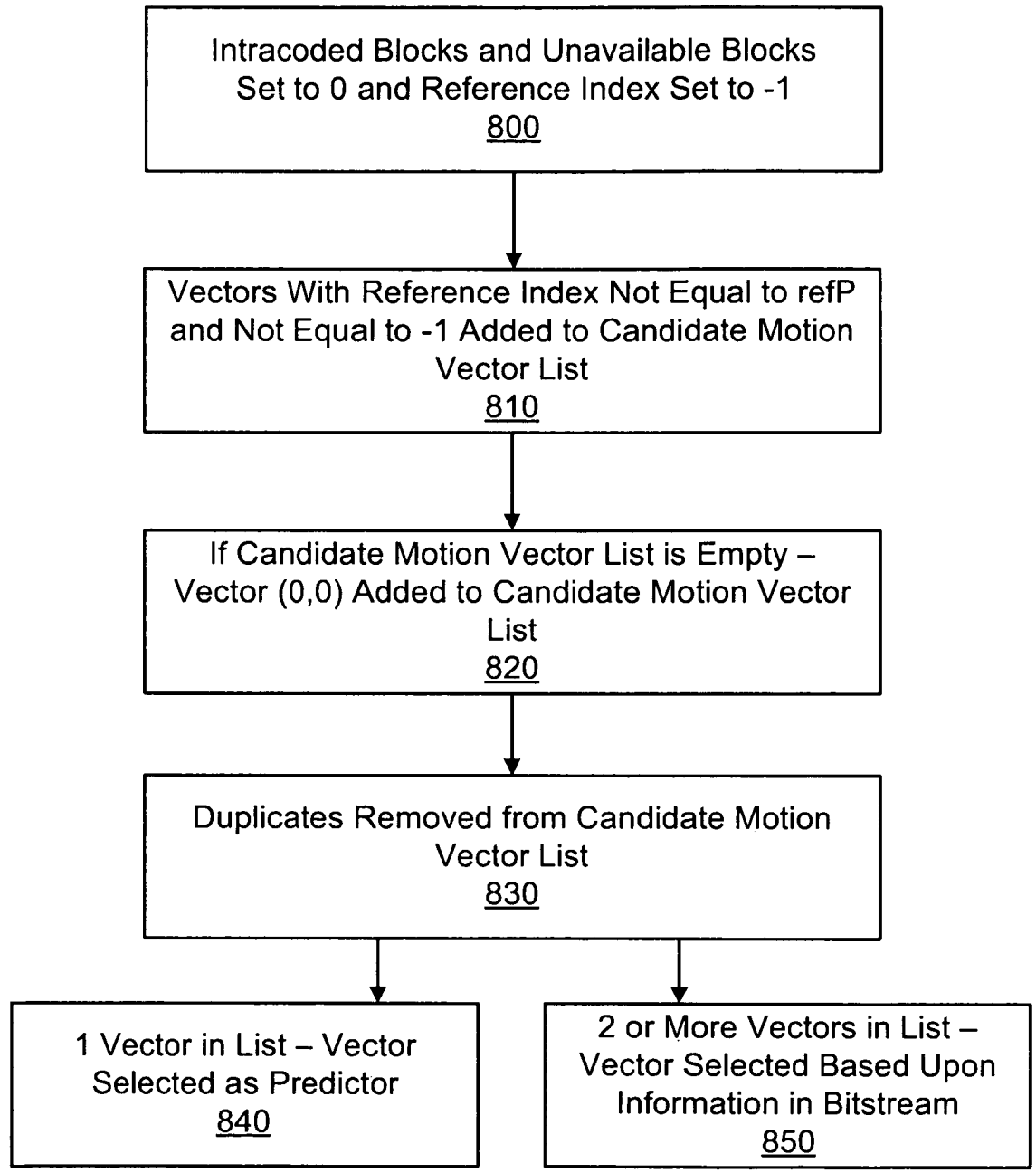
FIG. 8 is a flow chart showing a process for the selection of a predictor and reference index for a block P according to various embodiments.

A process for the selection of the predictor and reference index for block P proceeds as follows and is depicted in FIG. 8. First, it is determined whether a block (A, B or C) is intracoded or is not available. This can occur, for example, at a picture boundary. If a block (A, B or C) is intra coded or is not available, then at 800 the respective vector is set to 0 and the reference index in set to −1. It should be noted, however, that the −1 value is arbitrarily selected and may vary. In fact, the reference index could be set to any symbol that differentiates intra coded blocks and unavailable blocks from other blocks. At 810, vectors that have a reference index that is not equal to −1 are added to a candidate vector list. If the candidate motion vector list is empty, then the vector (0,0) is added to the list at 820.

If the candidate vector list contains motion vectors that are equal to each other, then only one of those vectors remain in the list, and others are removed at 830. Two motion vectors are equal to each other when their values are equal and their associated reference indices are equal. If the number of vectors in the list is 1, the vector in the list is selected as a predictor, and its reference index is selected as a reference index of the current block. This is represented at 840. If the number of vector in the list is 2 or more, either the first or second vector is selected based on information that is stored in the compressed bitstream, and the reference index of the selected motion vector is used as a reference index of the current block. This is represented at 850.

In one particular embodiment, one bit is used for signaling the selection of the predictor. In this embodiment, a bit value of 0 indicates the selection of the first candidate, while a bit value of 1 indicates the selection of the second candidate.

In an alternative implementation, vector selection is not signaled in the bistream. Instead, a vector may be selected based on a set of heuristics. However, the reference index associated with the selected vector is used for the current block.

Various embodiments of the present invention may be particularly useful for blocks for which motion vector differentials or reference indices are not stored in a bitstream. This may occur, for example, in SKIP and DIRECT modes in the H.264/AVC standard. However, these embodiments may be used in other situations as well. For example, entropy coding of a reference index of the current block may be improved (if the reference index is coded in the bistream) by coding the reference index differentially with respect to the predicted reference index.

In one particular embodiment, the number of initial predictors is 3. However, it is possible to select more initial predictors for potentially improved coding efficiency. Similarly, the maximum number of relevant predictors in the final list is restricted to maximum of 2 in one embodiment, but it is possible for a greater number predictors to be used. If more predictors are used, then the signaling is adapted to the larger number of predictors that can be signaled. The signaling can be based, for example, on fixed length codes, variable length Huffman codes, arithmetic codes or other codes.

In addition to the above, a number of alternative implementations of various embodiments are possible. For example, the order of the motion vectors that are placed into the list may be difference than vecA, vecB and vecC. The precise order may depend, for example, on the motion partition or the mode of the macroblock or neighboring macroblocks. The order may also be signaled in the bitstream at different levels, such as in the slice header or the picture header. Additionally, instead of adding a vector (0,0) to the list if the list is empty, a different predefined or signaled vector may be used. Furthermore, motion vectors from different pictures, such as from spatially co-located blocks from previously decoded pictures, can be used. Still further, additional candidate motion vectors can be generated from vecA, vecB, etc. This can be achieved, for example, by averaging two vectors.

Figure 9:
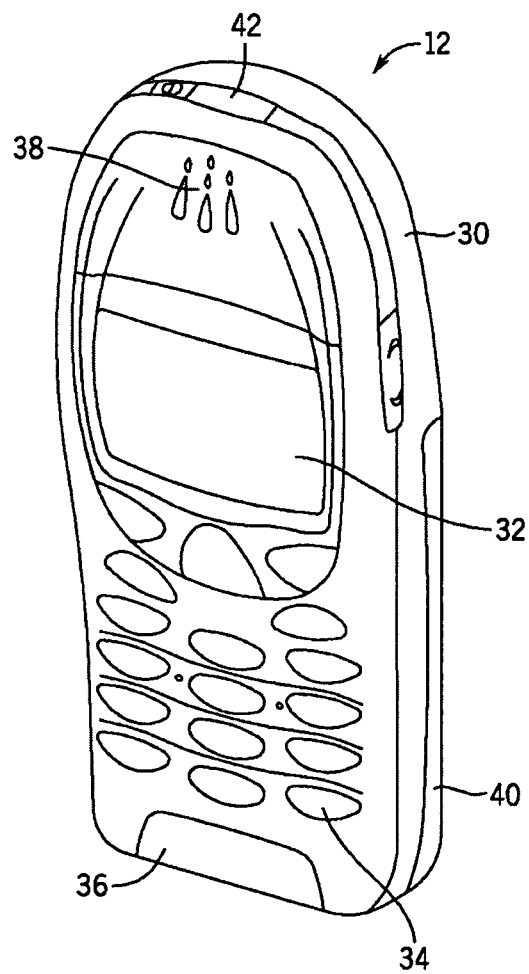
FIG. 9 is a perspective view of an electronic device that can be used in conjunction with the implementation of various embodiments of the present invention.
Figure 10:
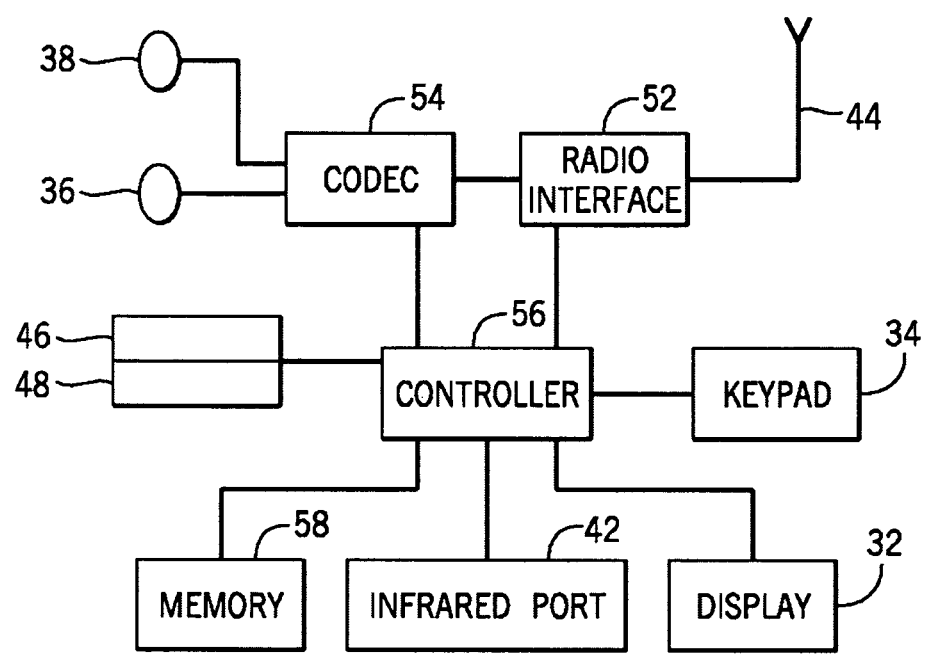
FIG. 10 is a schematic representation of the circuitry which may be included in the electronic device of FIG. 9.

FIGS. 9 and 10 show one representative electronic device 12 within which the present invention may be implemented. It should be understood, however, that the present invention is not intended to be limited to one particular type of device. The electronic device 12 of FIGS. 9 and 10 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Individual communication devices discussed herein may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs. Individual and specific structures described in the foregoing examples should be understood as constituting representative structure of means for performing specific functions described in the following the claims, although limitations in the claims should not be interpreted as constituting "means plus function" limitations in the event that the term "means" is not used therein.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for encoding an image, comprising:
ordering a plurality of motion vector predictors of a current image block, wherein a rank order of each motion vector predictor of the plurality of motion vector predictors is determined based at least in part on at least one of a coding mode of a block from which the respective motion vector predictor is derived and a reference index of the block from which the respective motion vector predictor is derived;
selecting a particular motion vector predictor of the current image block from the plurality of motion vector predictors; and
at least selectively providing in an encoded bitstream an indication representative of the rank order of the selected motion vector predictor,
wherein each block that has the same reference index as the current image block has a smaller rank order than each block with a reference index different from the reference index of the current image block.

2. The method of claim 1, wherein the coding mode indicates partitioning information for the block from which the respective motion vector predictor is derived.

3. The method of claim 2, wherein the partitioning information represents the size and the shape of the block from which the respective motion vector predictor is derived.

4. The method of claim 1, wherein the plurality of motion vector predictors comprise at least one motion vector for blocks selected from the group consisting of a neighboring block of the current image block, a block in a second image, a co-located block in the second image, a neighboring block of the co-located block in the second image, a block in a second layer and a block in a second view.

5. The method of claim 1, wherein an additional motion vector predictor is added to the plurality of motion vector predictors if a value of the additional motion vector predictor is not represented by the plurality of motion vector predictors.

6. The method of claim 1, wherein the plurality of motion vector predictors comprises motion vector predictors each having a distinct value.

7. The method of claim 1, further comprising:
using the reference index associated with the selected motion vector predictor as a reference index for the current image block.

8. A computer program product, embodied on a non-transitory machine readable medium, for causing a machine, when executed, to perform the processes of claim 1.

9. An apparatus, comprising:
a processor; and
a memory communicatively connected to the processor and including computer code configured to:
order a plurality of motion vector predictors of a current image block, wherein a rank order of each motion vector predictor of the plurality of motion vector predictors is determined based at least in part on at least one of a coding mode of a block from which the respective motion vector predictor is derived and a reference index of the block from which the respective motion vector predictor is derived;
select a particular motion vector predictor of the current image block from the plurality of motion vector predictors; and
at least selectively provide in an encoded bitstream an indication representative of the rank order of the selected motion vector predictor,
wherein each block that has the same reference index as the current image block has a smaller rank order than each block with a reference index different from the reference index of the current image block.

10. The apparatus of claim 9, wherein the coding mode indicates partitioning information for the block from which the respective motion vector predictor is derived.

11. The apparatus of claim 10, wherein the partitioning information represents the size and the shape of the block from which the respective motion vector predictor is derived.

12. The apparatus of claim 9, wherein the plurality of motion vector predictors comprise at least one motion vector for blocks selected from the group consisting of a neighboring block of the current image block, a block in a second image, a co-located block in the second image, a neighboring block of the co-located block in the second image, a block in a second layer and a block in a second view.

13. The apparatus of claim 9, wherein an additional motion vector predictor is added to the plurality of motion vector predictors if a value of the additional motion vector predictor is not represented by the plurality of motion vector predictors.

14. The apparatus of claim 9, wherein the plurality of motion vector predictors comprises motion vector predictors each having a distinct value.

15. The apparatus of claim 9, wherein the apparatus is further configured to use the reference index associated with the selected motion vector predictor as a reference index for the current image block.

16. An apparatus, comprising:
means for ordering a plurality of motion vector predictors of a current image block, wherein a rank order of each motion vector predictor of the plurality of motion vector predictors is determined based at least in part on at least one of a coding mode of a block from which the respective motion vector predictor is derived and a reference index of the block from which the respective motion vector predictor is derived;
means for selecting a particular motion vector predictor of the current image block from the plurality of motion vector predictors; and
means for at least selectively providing in an encoded bitstream an indication representative of the rank order of the selected motion vector predictor,
wherein each block that has the same reference index as the current image block has a smaller rank order than each block with a reference index different from the reference index of the current image block.

17. A method for decoding an image, comprising:
ordering a plurality of motion vector predictors of a current image block, wherein a rank order of each motion vector predictor of the plurality of motion vector predictors is determined based at least in part on at least one of a coding mode of a block from which the respective motion vector predictor is derived and a reference index of the block from which the respective motion vector predictor is derived; and
selecting a particular motion vector predictor of the current image block from the plurality of motion vector predictors for use in decoding, wherein information signaled within a bitstream is at least selectively used to select the particular motion vector,
using a predefined process to select a set of most probable motion vector predictors from the plurality of motion vector predictors; and
in an instance in which the predefined process results in the selection of more than one most probable motion vector predictor, using the information signaled in the bitstream to select the particular motion vector from the set of most probable motion vector predictors.

18. The method of claim 17, wherein the selecting of the particular motion vector further comprises, if the predefined process results in the selection of one most probable motion vector predictor, selecting the one most probable motion vector predictor as the particular motion vector predictor.

19. The method of claim 17, wherein a rank order of each motion vector predictor of the plurality of motion vector predictors is determined based at least in part on information signaled in the bitstream.

20. The method of claim 17, further comprising removing duplicate motion vector predictors from the plurality of motion vector predictors.

21. The method of claim 17, further comprising adding a predefined vector to the plurality of motion vector predictors, if the number of motion vector predictors is zero.

22. The method of claim 17, further comprising including an additional motion vector predictor that has been signaled in the bitstream to the plurality of motion vector predictors, if the number of motion vector predictors is zero.

23. The method of claim 17, wherein the coding mode indicates partitioning information for the block from which the respective motion vector predictor is derived.

24. The method of claim 23, wherein the partitioning information represents a size and a shape of the block from which the respective motion vector predictor is derived.

25. The method of claim 17, wherein the plurality of motion vector predictor comprise at least one motion vector for blocks selected from the group consisting of a neighboring block of the current image block, a block in a second image, a co-located block in the second image, a neighboring block of the co-located block in the second image, a block in a second layer and a block in a second view.

26. The method of claim 17, further comprising:
using the reference index associated with the selected motion vector predictor as a reference index for the current image block.

27. A computer program product, embodied on a non-transitory machine readable medium, for causing a machine, when executed, to perform the processes of claim 17.

28. An apparatus, comprising:
a processor; and
a memory communicatively connected to the processor and including computer code configured to:
to order a plurality of motion vector predictors of a current image block, wherein a rank order of each motion vector predictor of the plurality of motion vector predictors is determined based at least in part on at least one of a coding mode of a block from which the respective motion vector predictor is derived and a reference index of the block from which the respective motion vector predictor is derived; and
select a particular motion vector predictor of the current image block from the plurality of motion vector predictors for use in decoding, wherein information signaled within a bitstream is at least selectively used to select the particular motion vector,
use a predefined process to select a set of most probable motion vector predictors from the plurality of motion vector predictors; and
in an instance in which the predefined process results in the selection of more than one most probable motion vector predictor, using the information signaled in the bitstream to select the particular motion vector from the set of most probable motion vector predictors.

29. The apparatus of claim 28, wherein the selecting of the particular motion vector further comprises, if the predefined process results in the selection of one most probable motion vector predictor, selecting the one most probable motion vector predictor as the particular motion vector predictor.

30. The apparatus of claim 28, wherein a rank order of each motion vector predictor of the plurality of motion vector predictors is determined based at least in part on information signaled in the bitstream.

31. The apparatus of claim 28, wherein the apparatus is further configured to remove duplicate motion vector predictors from the plurality of motion vector predictors.

32. The apparatus of claim 28, wherein the apparatus is further configured to add a predefined vector to the plurality of motion vector predictors, if the number of motion vector predictors is zero.

33. The apparatus of claim 28, wherein the apparatus is further configured to include an additional motion vector predictor that has been signaled in the bitstream to the plurality of motion vector predictors, if the number of motion vector predictors is zero.

34. The apparatus of claim 28, wherein the coding mode indicates partitioning information for the block from which the respective motion vector predictor is derived.

35. The apparatus of claim 34, wherein the partitioning information represents a size and a shape of the block from which the respective motion vector predictor is derived.

36. The apparatus of claim 28, wherein the plurality of motion vector predictor comprise at least one motion vector for blocks selected from the group consisting of a neighboring block of the current image block, a block in a second image, a co-located block in the second image, a neighboring block of the co-located block in the second image, a block in a second layer and a block in a second view.

37. The apparatus of claim 28, wherein the apparatus is further configured to use the reference index associated with the selected motion vector predictor as a reference index for the current image block.

38. An apparatus, comprising:
   means for ordering a plurality of motion vector predictors of a current image block, wherein a rank order of each motion vector predictor of the plurality of motion vector predictors is determined based at least in part on at least one of a coding mode of a block from which the respective motion vector predictor is derived and a reference index of the block from which the respective motion vector predictor is derived; and
   means for selecting a particular motion vector predictor of the current image block from the plurality of motion vector predictors for use in decoding, wherein information signaled within a bitstream is at least selectively used to select the particular motion vector,
   means for using a predefined process to select a set of most probable motion vector predictors from the plurality of motion vector predictors; and
   in an instance in which the predefined process results in the selection of more than one most probable motion vector predictor, means for using the information signaled in the bitstream to select the particular motion vector from the set of most probable motion vector predictors.

\* \* \* \* \*